United States Patent [19]

Adar et al.

[11] Patent Number: 5,212,758
[45] Date of Patent: May 18, 1993

[54] PLANAR LENS AND LOW ORDER ARRAY MULTIPLEXER

[75] Inventors: Renen Adar, Westfield; Corrado Dragone, Little Silver; Charles H. Henry, Skillman, all of N.J.

[73] Assignee: AT&T Bell Laboratories, Murray Hill, N.J.

[21] Appl. No.: 866,614

[22] Filed: Apr. 10, 1992

[51] Int. Cl.$^5$ .................... G02B 6/10; H04J 14/00
[52] U.S. Cl. ..................... 385/129; 385/130; 385/32; 385/33; 385/43; 359/115; 359/127; 359/131
[58] Field of Search .............. 385/27, 14, 30, 32, 385/33, 42, 43, 46, 50, 129, 130, 132, 119; 359/115, 116, 123, 124, 127, 131

[56] References Cited

U.S. PATENT DOCUMENTS

| | | | |
|---|---|---|---|
| 3,719,462 | 3/1973 | Andreatch, Jr. et al. | 385/129 X |
| 4,763,977 | 8/1988 | Kawasaki et al. | 385/43 X |
| 4,897,671 | 1/1990 | Mahapatra et al. | 385/130 |
| 4,978,188 | 12/1990 | Kawachi et al. | 385/130 X |
| 5,064,263 | 11/1991 | Stein | 385/130 X |
| 5,076,654 | 12/1991 | Presby | 385/129 |
| 5,117,473 | 5/1992 | Pan | 385/46 |
| 5,136,671 | 8/1992 | Dragone | 385/46 |
| 5,157,746 | 10/1992 | Tobita et al. | 385/33 |

OTHER PUBLICATIONS

C. H. Henry, et al. "Glass Waveguides on Silicon for Hybrid Optical Packaging", 7 *J. Lightwave Technol.*, pp. 1530-1539 (1989).

*Primary Examiner*—Brian Healy
*Attorney, Agent, or Firm*—Glen E. Books

[57] ABSTRACT

An integrated optic device useful as a planar lens or a low order array multiplexer comprises a pair of optical couplers and an array of plural waveguides extending between the couplers in an "S" configuration to provide closely spaced optical path lengths. An "S" configuration provides equal path lengths for an optical lens. Incremental lengths added to the "S" in the region between curve reversal can provide small path length increments for a low order array multiplexer or demultiplexer.

8 Claims, 3 Drawing Sheets

— 1.53 μm CHANNEL
--- 1.31 μm CHANNEL

PLANAR LENS AND LOW ORDER ARRAY MULTIPLEXER

FIELD OF THE INVENTION

This invention relates to an integrated optic device useful as a planar lens or a low order array multiplexer. The invention is particularly useful for broadband multiplexing or demultiplexing of optical signals.

BACKGROUND OF THE INVENTION

Broadband wavelength division multiplexers (WDMs) have many applications in optical communications. For example, WDMs can be used to combine pump and signal wavelengths in an optical amplifying system. As another example, WDMs can be used to increase the long distance capacity of optical fibers by adding bands centered at different wavelengths. As an illustration, a band centered at 1.55 micrometers can be added to supplement capacity at the 1.30 micrometer band. The two bands can be used to provide bidirectional communications on a single fiber.

WDMs require components capable of combining and separating optical signals in broad wavelength bands. Such components have been of primarily two types: Mach-Zehnder interferometers and wavelength dependent directional couplers. Such devices are easily fabricated with optical waveguides using a single mask level, and they have low back reflection and high peak transmission. However, their spectral behavior is sinusoidal, and consequently they have low crosstalk over only a narrow wavelength range. Furthermore, it is very difficult to fabricate such devices with a precisely controlled wavelength of narrowband rejection. Consequently, interferometers and directional couplers are often inadequate for broadband applications, and thin film filters are needed to increase rejection ranges.

A new type of integrated optic multiplexer fabricated from waveguide arrays is described in U.S. patent application, Ser. No. 07/748,131, now U.S. Pat. No. 5,136,671, filed by C. Dragone on Aug. 21, 1991, and entitled "Improved Optical Switch, Multiplexer and Demultiplexer". These integrated devices comprise an array of waveguides disposed between a pair of couplers. They are useful for making closely spaced, narrowband channels for dense wavelength division multiplexing. However, they are not suitable for broadband multiplexers requiring low order devices. Accordingly, there is a need for an integrated optic device which can be used as a low order grating or a lens.

SUMMARY OF THE INVENTION

An integrated optic device useful as a planar lens or a low order array multiplexer comprises a pair of optical couplers and an array of plural waveguides extending between the couplers in an "S" configuration to provide closely spaced optical path lengths. An "S" configuration provides equal path lengths for an optical lens. Incremental lengths added to the "S" in the region between curve reversal can provide small path length increments for a low order array multiplexer or demultiplexer.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphical illustration, are not to scale.

DETAILED DESCRIPTION

Figure 1:
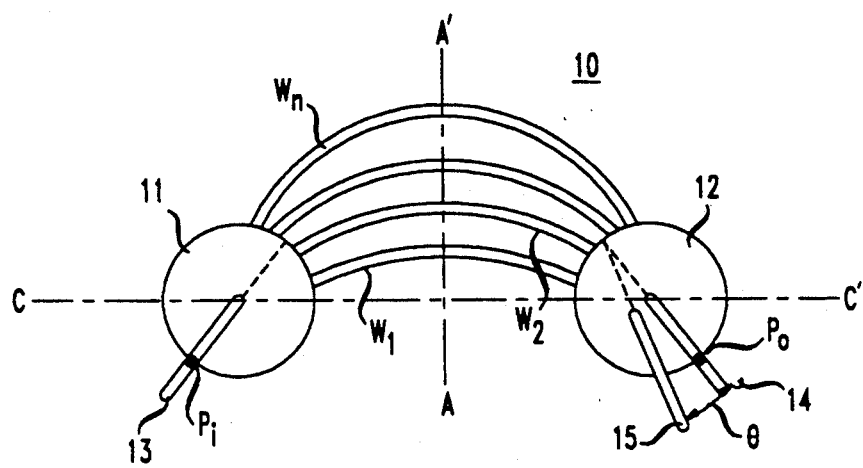
FIG. 1 is a schematic top view of a conventional integrated optic demultiplexer useful in illustrating the problems which the invention addresses.

Referring to the drawings, FIG. 1 is a top view of a conventional waveguide array multiplexer 10 comprising a first array coupler 11 coupled via an array of n waveguides $W_1, W_2, \ldots, W_n$ to a second array coupler 12. The array couplers 11 and 12 are typically slab waveguide regions each configured for providing substantially identical optical paths between an input or output point and a plurality of peripherally distributed waveguides. In one mode of operation coupler 11 receives light at $P_i$ from an input waveguide 13, and coupler 12 distributes received light to a pair of output waveguides 14 and 15 near $P_o$. The array of n waveguides between couplers 11 and 12 are arrayed in a "C" configuration with the waveguides spreading apart away from the couplers in order to reduce crosstalk. Each successive waveguide provides an optical path which is longer than that of its predecessor by a constant amount $\Delta l$.

In operation, light in the fundamental mode of input waveguide 13 spreads by diffraction from the center of coupler 11, forming a circular wavefront of constant phase. The waveguides around the circumference of coupler 11 are all excited with the same phase. Since the waveguides separate, the optical signals become decoupled. However, after decoupling, the light in the waveguides initially continues with a circular phase front and retains nearly the same amplitude distribution as when the waveguides were initially excited.

The array is designed so that each successive waveguide has an increased length $\Delta l$ compared to its lower neighbor, and the waveguides terminate in a converging circle at coupler 12. If $\Delta l = m\lambda_o$, where $\lambda_o$ is the wavelength in the medium and m is an integer order number, then the phase front of the light in coupler 12 forms a circular wave converging on the coupler axis at $P_o$. At a different wavelength $\lambda_o + \Delta\lambda$, the phase front emerging from the array will be tilted at a small angle $\theta$ relative to the coupler axis CC' and will couple efficiently near $P_0$ to waveguide 15 which is angularly displaced by $\theta$ from the coupler axis. In this example output waveguide 14 is positioned to coupled to $\lambda_o$ and output waveguide 15 to $\lambda_0 + \Delta\lambda$. This device can thus be used to receive a two wavelength input from waveguide 13 ($\lambda_o$ and $\lambda_o + \Delta\lambda$) and provide wavelength separated outputs, $\lambda_o$ at 14 and $\lambda_o + \Delta\lambda$ at 15. The device thus acts as a grating and a demultiplexer. In the reverse direction it can act as a multiplexer.

A difficulty with this conventional structure arises in efforts to make low order devices, i.e. devices with values of m less than about 10. Low order devices require path length differences $\Delta l$ on the order of a few wavelengths. There are also requirements that the waveguides be separated for decoupling and that the waveguides avoid sharp bends to prevent loss. In view of these competing requirements, the "C" configuration array of FIG. 1 cannot be readily adapted to provide the small constant path length differences required for low order gratings. Thus the conventional structure cannot be readily adapted for making broadband multiplexers or planar lenses.

Figure 2:
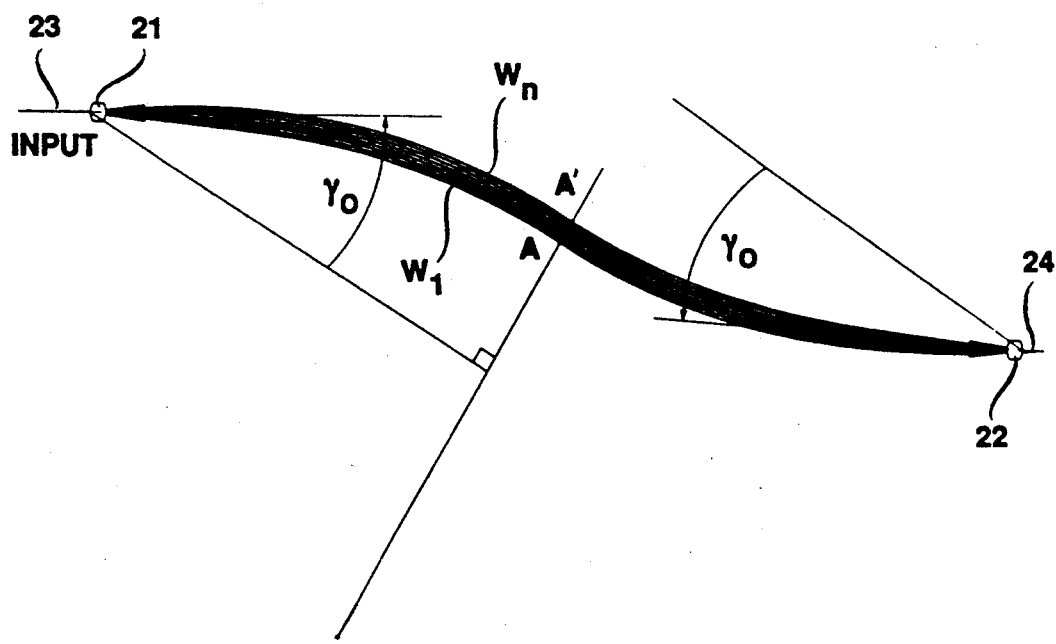
FIG. 2 is a schematic top view of an integrated planar optic lens in accordance with the invention.

FIG. 2 is a schematic top view of a device in accordance with the invention adapted to operate as an integrated planar optic lens. The FIG. 2 device is similar to that of FIG. 1 except that the n waveguides ($W_1$, $W_2$, ..., $W_n$) between array couplers 21 and 22 are arrayed in an "S" configuration rather than a "C" configuration. Specifically, each waveguide comprises two substantially circular arcs which reverse direction of curvature at AA' half way between the couplers. In the "S" configuration, each of the n waveguides presents the same length optical path between couplers 21 and 22. Thus light emanating from the center $P_i$ of coupler 21 will arrive at the center $P_o$ of coupler 22 with the same phase from each of the n waveguides. $P_i$ and $P_o$ are thus conjugated points, and the structure, with a single output waveguide 24, acts as a planar lens.

Specifically, coupler 21 is preferably a slab geometry waveguide in the configuration of a circular sector providing equal optical paths between an input waveguide L3 at $P_i$ and each of the plurality of circumferentially arrayed waveguides ($W_1$, $W_2$, ..., $W_n$). Coupler 22 is preferably a similar slab geometry waveguide receiving the plural waveguides at circumferential positions and providing equal paths from the guides to the center $P_o$ to 22.

That the "S" configuration of waveguides can be designed to provide equal path lengths from 21 to 22 can be seen from FIG. 1 by considering a line of symmetry AA' perpendicular to the line $P_oP_i$ in the "C" configuration device. In the FIG. 1 device, the relationship between waveguide and pathlength is:

$$W_1 = l, \ W_2 = l + \Delta l, \ W_3 = l + 2\Delta l, \ldots,$$
$$W_n = l + (n-1)\Delta l.$$

Now consider an "S" configuration structure formed by cutting across AA' and axially rotating the structure by 180° so that the left half of $W_1$ is connected to the right half of $W_n$, the left half of $W_2$ is connected to the right half of $W_{n-1}$, etc. Then the total path length for each waveguide is the same, i.e.

$$l + \frac{(n-1)\Delta l}{2}.$$

Moreover the required separation to reduce crosstalk is retained and no sharp bend is introduced. Thus an "S" configuration integrated optic device can provide equal path lengths from $P_i$ to $P_o$.

As a guide to laying out the mask for the FIG. 2 structure, it can be seen from FIG. 2 that the straight waveguides forming the input coupler fanout are bent down to normal incidence on line AA', which is tilted by an angle of $\pi/2 - \gamma_0$ relative to the input optical axis. Each waveguide in the input section consists of straight segments connected with a circular arc having a radius of curvature equal to or larger than 15 mm. The input section waveguides have equal length differences between neighboring waveguides and are arranged in increasing length such that $W_1$ is the shortest and $W_n$ is the longest. The waveguides are also equally spaced at their intersection on line AA'. The output section is symmetrical with the direction of curvature reversed. In order to minimize the overall device dimension, $\gamma_0$ was optimized at 30°. The total length and height of an exemplary device was 25 mm and 4 mm, respectively.

The FIG. 2 device preferably comprises phosphorus doped glass waveguides on a silicon substrate advantageously fabricated as described in C. H. Henry, et al, "Glass Waveguides on Silicon for Hybrid Optical Packaging", 7 *J. Lightwave Technol.*, pp. 1530–1539 (1989). In essence, a silicon substrate is provided and a base layer of 15 micrometers of $SiO_2$ is grown on the silicon by high pressure steam oxidation. A core layer of 8% phosphorus doped glass having a thickness in the range of 3-4 micrometers is deposited on the oxide using LPCVD, and the core layer can be dry etched as by RIE to pattern the couplers and the waveguides. The core glass is then annealed, and thereafter a 7 micrometer layer of phosphorus and boron doped glass is deposited to act as a top cladding. Typical waveguide core widths are in the range 4.5-6.5 micrometers, typical decoupling spacing between adjacent waveguides is thirty micrometers center-to-center, and typical minimum bending radius is about 15 mm.

Figure 3:
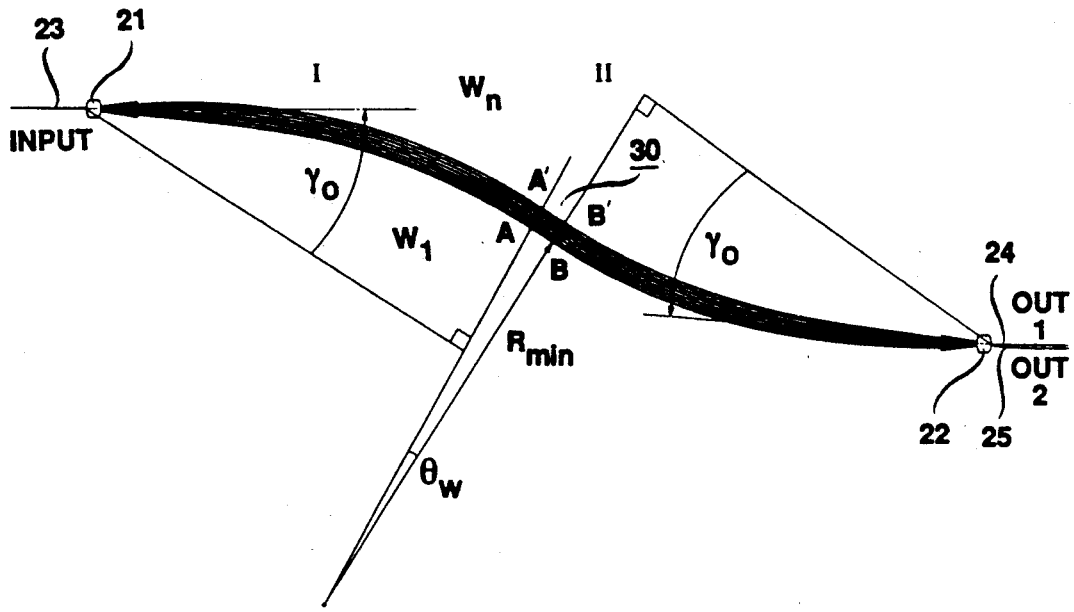
FIG. 3 is a schematic top view of an integrated low order grating in accordance with the invention.

FIG. 3 is a schematic top view of a device in accordance with the invention adopted to act as a low order array demultiplexer. The "S" configuration grating is similar to the "S" configuration lens except that in the grating, substantially linear regions of incrementally increasing length are added to the waveguides in the region II of curve reversal. Specifically, the added segments 30 are the segments between AA' and BB'. With these added regions, each successive waveguide has a path length incrementally longer than its predecessor by an amount $\Delta l$. These increments are added without sharp bends or reduced spacing between waveguides. Thus successive waveguides in an "S" configuration grating can be readily provided with small incremental increases in length far smaller than the incremental increases in a "C" configuration device. The device can thus act as a demultiplexer like the device of FIG. 1, receiving channels of $\lambda_1$ and $\lambda_2$ on input waveguide 23 and providing separated output channels $\lambda_1$ on output 24 and $\lambda_2$ on 25. Alternatively, in the reverse direction, the device can act as a multiplexer presenting separate channels $\lambda_1$, $\lambda_2$ at 24 and 25 to a single output guide 23.

The mask layout for the FIG. 3 device is similar to that for the FIG. 2 device except for the extension section II located in the region of curve reversal between input section I and output section III. The waveguides in section II can conveniently be concentric arcs of small angle $\theta_w$ and radii of curvature equal to or greater than the minimum of 15 mm. The path difference between the waveguides in section II—which determines the total path length difference $\Delta l$—is related to the angle $\theta_w$ and to the separation dh between waveguides along lines AA' and BB', by $\Delta l = \theta_w dh$. By controlling $\theta_w$, one can obtain array multiplexers of any desired order using the same design for sections I and III. In the limit of $\theta_w = 0$, the device is a planar lens.

Figure 4:
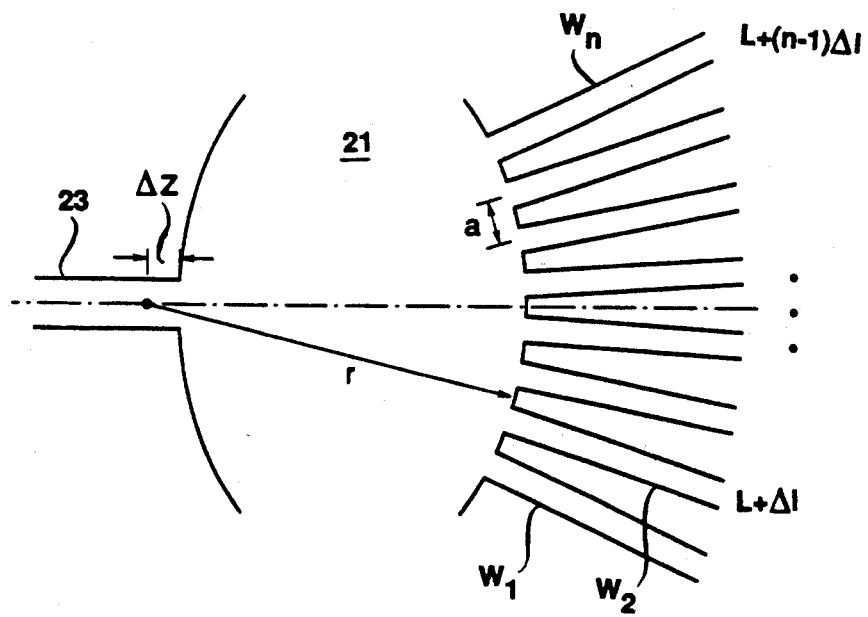
FIGS. 4 and 5 are schematic views of input and output array couplers, respectively, illustrating the structural parameters of the FIG. 3 device.
Figure 5:
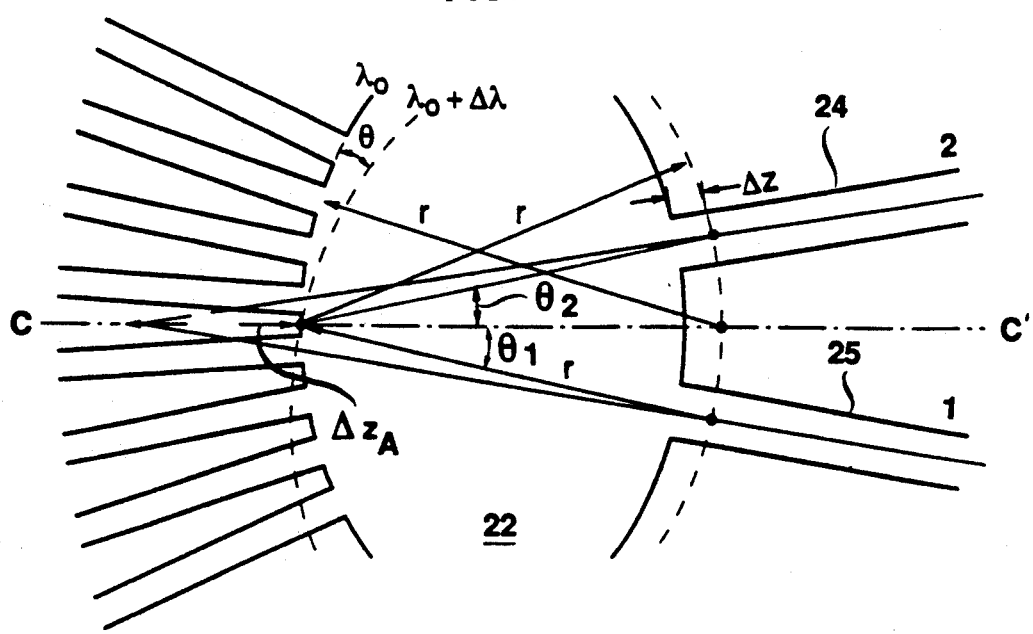

"S" configuration arrays were fabricated in orders 1, 3 and 8 for broad band two channel multiplexing. The main structural parameters of these devices are illustrated in FIGS. 4 and 5 which are enlarged views of the regions near preferred couplers 21 and 22, respectively. As illustrated in FIG. 4, a is the center-to-center spacing between waveguides $W_1, W_2, \ldots, W_n$ at the circumference of input coupler 21. The center of the circular wavefront is set back from the exit point of the waveguide by $\Delta Z$. W is the waveguide width, and r is the array radius.

As shown in FIG. 5, $\theta_1$ and $\theta_2$ are the offset angles between the coupler axis CC' and the output waveguides 24 and 25 which receive wavebands centered at $\lambda_1$ and $\lambda_2$ respectively. $\Delta Za$ is the distance to the point at which the waveguides are directed for nearly symmetric array excitation.

Applicants fabricated and tested three gratings (filters) having the parameters listed in Table 1 below:

TABLE 1

|  | Array 1 | Array 2 | Array 3 |
|---|---|---|---|
| $\lambda_1$ | 1.31 μm | 1.475 μm | 0.98 μm |
| $\lambda_2$ | 1.53 μm | 1.55 μm | 1.55 μm |
| $\Delta l$ | 2.935 μm | 8.356 μm | 0.872 μm |
| m (order) | 3 | 8 | 1 |
| a | 9.0 μm | 9.0 μm | 9.0 μm |
| w | 5.5 μm | 5.5 μm | 4.5 μm |
| $\theta_1$ | −1.486° | −1.340° | −1.422° |
| $\theta_2$ | 1.490° | 1.341° | 1.430° |
| $\Delta Z$ | 45 μm | 45 μm | 45 μm |
| $\Delta Za$ | 220 μm | 220 μm | 220 μm |
| r | 590 mm | 590 mm | 600 mm |

Figure 6:
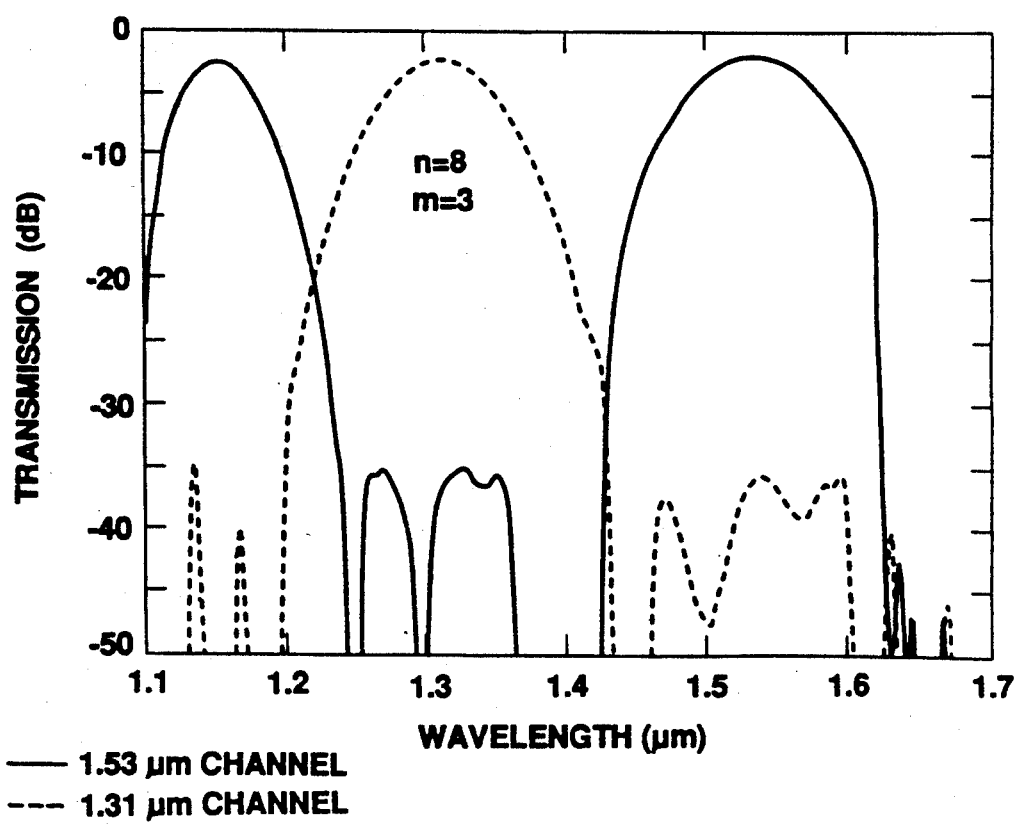
FIG. 6 is a graphical illustration showing the performance characteristics of a device of the type shown in FIG. 3.

The spectral transmission characteristics of the devices were then measured by coupling light through them using standard single mode fibers with a cutoff wavelength close to 1100 μm. Compared to conventional waveguide multiplexers, these devices exhibit wide spectral ranges of low crosstalk. The best performing device was array 1 whose measured transmission characteristics are plotted in FIG. 6. The crosstalk and fiber-to-fiber insertion loss for the device was about −35 dB and −2 dB, respectively, believed to be the lowest values yet reported for array multiplexers.

It is to be understood that the above described embodiments are illustrative of only a few of the many possible specific embodiments which can represent applications of the principles of the invention. Thus numerous and varied other arrangements can be made by those skilled in the art without departing from the spirit and scope of the invention.

We claim:

1. In an optical device of the type comprising an input coupler, a plurality of optical waveguides coupled at equal pathlengths from the input to said coupler, and an output coupler for receiving said plurality of waveguides, the improvement wherein said waveguides are configured in an S-shaped array in order to present substantially equal pathlengths at said output coupler and wherein each waveguide in said array comprises a first curved region having a radius of curvature in excess of about 15 mm and a second region curved in the opposite direction having a radius of curvature in excess of about 15 mm.

2. In an optical device of the type comprising an input coupler, a plurality of optical waveguides coupled at equal pathlengths from the input to said coupler, and an output coupler for receiving said plurality of waveguides, the improvement wherein said waveguides are configured in an S-shaped array in order to present substantially equal pathlengths at said output coupler and wherein each waveguide in said array is placed at an angle $\gamma_0$ relative to the input optical axis wherein said waveguide array is normal to a line tilted by an angle $\pi/2 - \gamma_0$ relative to the input optical axis.

3. The improved device of claim 2, wherein said waveguides are both normal to said line and equally spaced at said line.

4. The improved device of claim 2, wherein $\gamma_0$ is about 30°.

5. In an optical device of the type comprising an input coupler, a plurality of optical waveguides coupled at equal pathlengths from the input to said coupler, and an output coupler for receiving said plurality of waveguides, the improvement wherein said waveguides are configured in an S-shaped array in order to present substantially equal pathlengths at said output coupler and wherein said S-shaped array comprises a region between reversal of curvature and said region comprises regions of incrementally increasing length from one waveguide to the next in order to provide successive waveguides of said plurality with incrementally increasing pathlengths between said couplers.

6. The improved device of claim 5, wherein said output coupler includes plural output waveguides in order to act as a demultiplexer.

7. The improved device of claim 5, wherein said input coupler includes plural input waveguides in order to act as a multiplexer.

8. A planar lens comprising:
 an optical input coupler for receiving an optical input signal at an input point and distributing said optical signal at substantially identical optical pathlengths to a plurality of waveguides;
 a plurality of optical waveguides coupled at equal pathlengths from said input point, said waveguides configured in an S-shaped array in order to present substantially equal pathlengths to an output coupler; and
 an output coupler for receiving said optical waveguides and presenting the optical signals from said waveguides at substantially equal pathlengths to an output point.

* * * * *